2,832,995

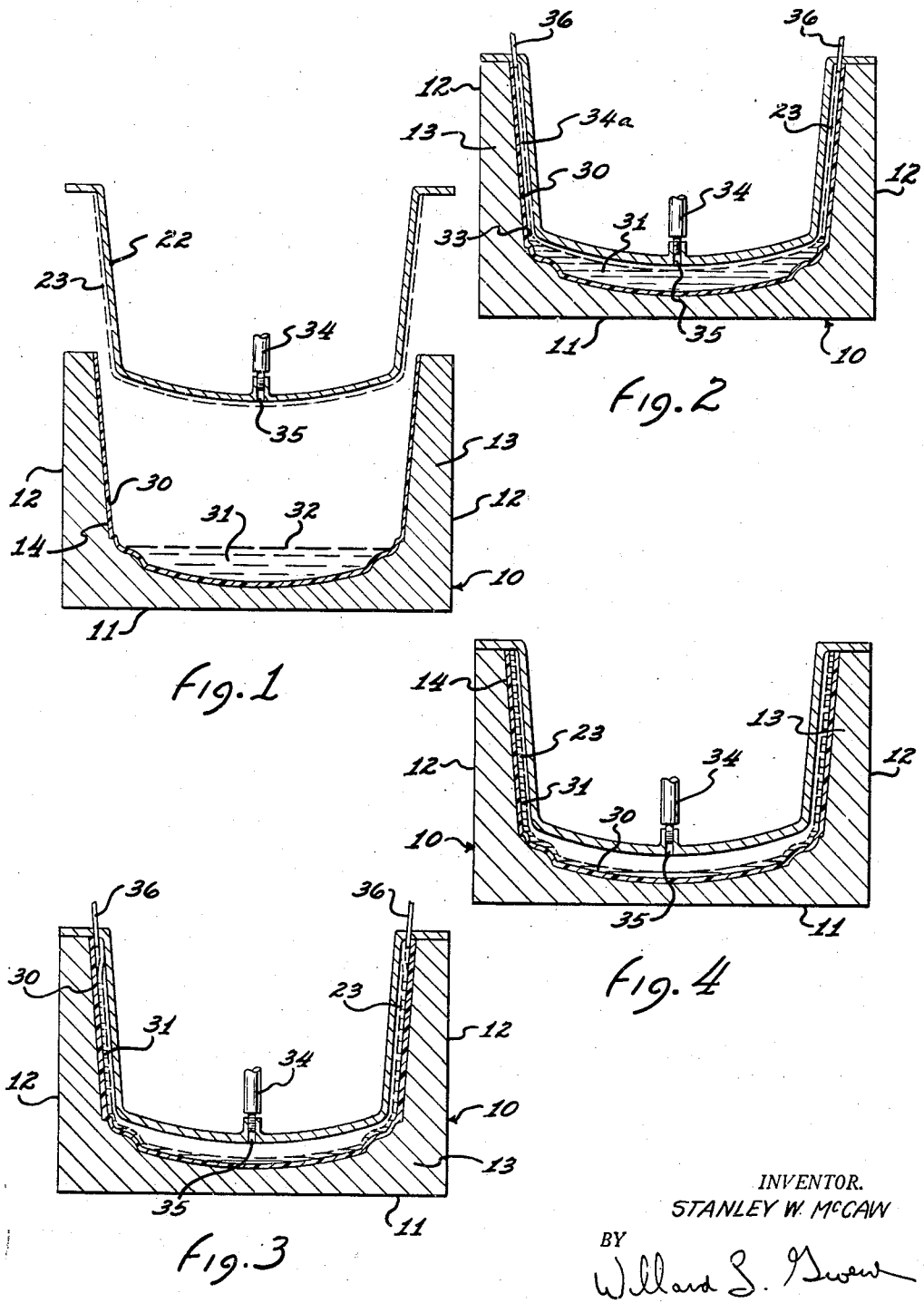

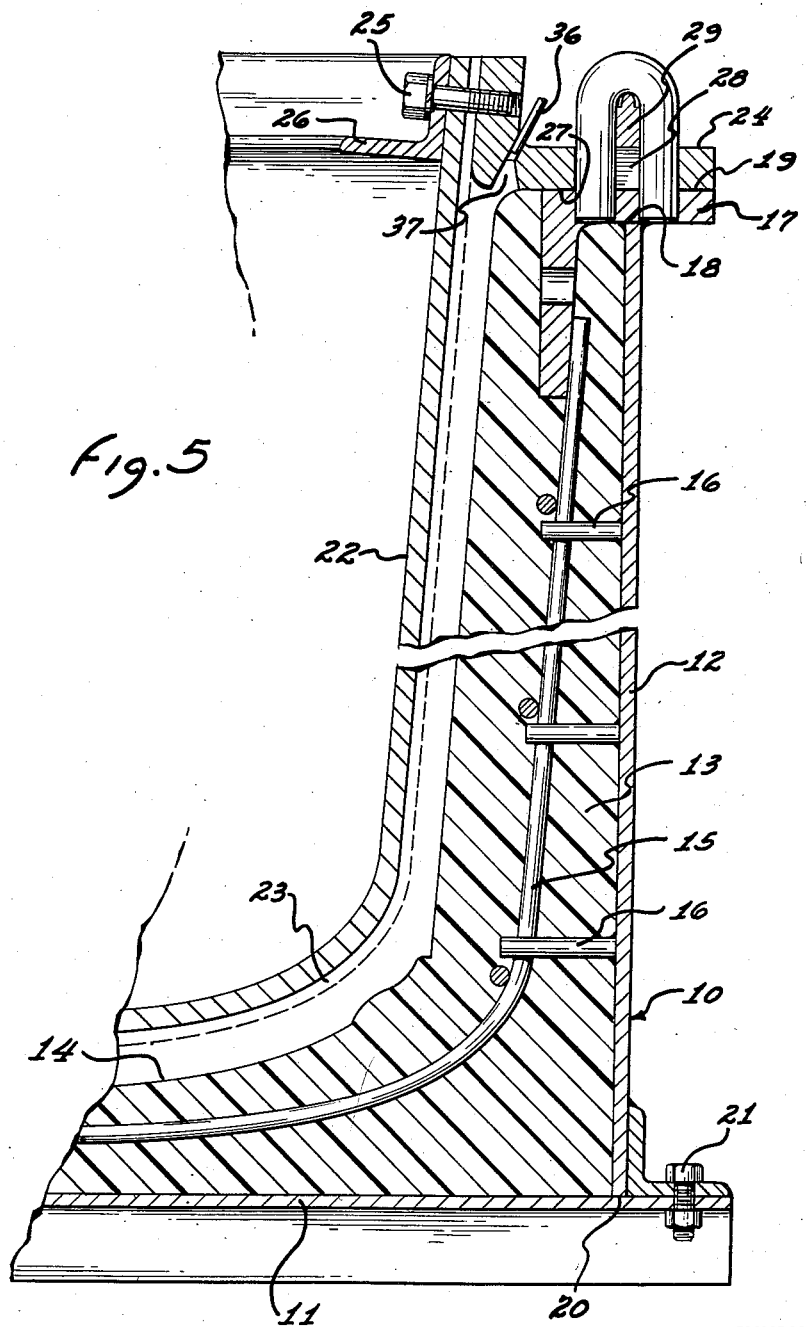

APPARATUS FOR MOLDING BURIAL VAULTS

Stanley W. McCaw, Phoenix, Ariz., assignor of fifty percent to Mel L. Decker, Phoenix, Ariz.

Application November 26, 1954, Serial No. 471,249

2 Claims. (Cl. 18—34)

The object of this invention is to provide an improved apparatus for forming plastic burial vaults or the like in a more economical and rapid manner.

Further features and advantages of this invention will appear from a detailed description of the drawings in which:

Fig. 1 is a diagrammatic sectional view through the mold system showing the first step in the molding process.

Fig. 2 is a view similar to Fig. 1 but showing the second step in the molding process.

Fig. 3 is a view similar to Figs. 1 and 2 but showing the third step in the molding process.

Fig. 4 is a view similar to Figs. 1, 2 and 3 showing the final step in the molding process.

Fig. 5 is an enlarged fragmentary cross section through the mold structure shown at the time of the beginning of the second step in Fig. 2.

As illustrative of one embodiment of this invention, there is provided the mold structure comprising, the female mold 10 having a base 11 and suitable sides 12. The interior portion 13 is cast of reinforced plastic from a master pattern so as to form the interior molding surface 14 of desired configuration. Suitable reinforcing rods 15 supported on studs 16 fixed to sides 12 are provided in the plastic lining of the female mold 10. An angle member 17 is rigidly secured to the upper edge 18 of the sides 12 and also supports the upper ends of the reinforcing rods 15, the angle member 17 having an accurately machined flat top surface 19.

To form the female plastic lining, the unit comprising the sides 12, and reinforcing rods, and angle member 17 is inverted over the master pattern and the plastic poured in until it is level with the edges 20 on the bottom of the sides 12, the material being leveled off to these edges. The base plate 11 is then bolted to the sides 12 by suitable bolts 21. The entire unit is then suitably cured in this upside down position. When the plastic cast is removed from the pattern, only waxing and normal finishing is necessary.

The male mold member 22 may take the form of an open tub of light weight plate rolled to the general contour of the female mold 10 but having no particular matching with either the curves or dimensions of the female mold. The male mold member is then provided with a vinyl type outer bag 23 prepared by using the male mold member 22 as a form. The male mold member 22 and bag 23 assembly are then secured to the upper ring 24 by suitable bolts 25 and angle piece 26. The molding ring has a mating face 27 which tightly engages the mating face or top surface 19 of the angle member 17. Suitable U-clamp members fixed to the angle member 17 and extending up through slots 28 in the upper ring 24 are engaged by wedges 29 to secure the members 17 and 24 together as best shown in Fig. 5.

The operation of the above described apparatus to form the burial vaults is as follows: Referring to Fig. 1 the female section 10 rests on its base 11 on the production floor and the male mold member with its bag 23 is raised or lowered relative to the female mold 10 by a suitable overhead hoist. In Fig. 1 the male section 22 is shown partially lowered into the female section 10. At this time a fibre glass mat 30 has been loosely placed in the mold and an appropriate supply of fluid resins 31 poured in the female mold 10 over the mat 30 to the level 32 in Fig. 1.

In Fig. 2 the male member 22 and bag 23 have been lowered into clamped up position with members 17 and 24 securely clamped up by the U-clamps and wedges 29 as described. The fluid resin 31 which has been displaced by the male member 22 is forced partially up between the side walls to the level 33 leaving the space 34a above this level 33. When this condition has been attained, compressed air is introduced through an air inlet pipe 34a opening at 35 at the bottom of the crown of the male member 22 and behind the bag 23 into the space between the bag and the male member 22.

Referring to Fig. 3, the air pressure forces the bag outward toward the mold and against the fibre glass mat, the bag being prevented from sticking or sealing against the mat by the matted strands of fibre glass. This expansion of the bag under air pressure causes the resin to be forced outwardly from the opening 35 of the air inlet pipe 34 and finally upwardly of the sides of the mold through the interstices of the fibre glass. To assure a more uniform rise of this fluid and to avoid the entrapment of air bubbles, a vacuum line 36, Fig. 5, from a suitable compressor is provided to maintain a minus pressure in the area 37. The pressure and suction cycle is complete when the fluid 31 rises in a suitable sight gage in the vacuum line 36.

In Fig. 4 the above condition has been reached at which time the vacuum line is disconnected and voided of resin. Pressure, however, is maintained through the curing period. When curing is complete, the pressure is released and the locking wedges knocked out. At this time a small amount of air returned to the space behind the bag 23 will force the male member 22 upwardly, breaking the surface adhesion between the bag and the work W. The air is then exhausted and the male section is removed by the hoist. Because of the design of the vault W, providing more than ample draft, removal of the fabricated part from the female mold is a simple manual operation.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

Having thus fully set forth and described this invention what is claimed and desired to be obtained by United States Letters Patent is:

1. A mold for forming a plastic burial vault or the like, comprising, a female member having an opening at the top, a base, sides fixed to said base, reinforcing bars fixed to said sides, a lining surrounding said reinforcing bars conforming to the outside configuration of the work piece to be molded, an angle member secured around the top edge of said sides having a sealing surface, a male member adapted to be presented into said female member, an expansible bag covering the outside surface of the male member, a clamping ring fixed to said male member and engaging the outer edge of said bag to form an air tight space between the inside of said bag and the outside surface of said male member, said clamping ring having a mating sealing surface adapted to engage said sealing surface on said angle member so as to form an airtight chamber between the outside of said bag and said lining, a vacuum suction line in said clamping ring connected into said space between said bag and lining, clamping means between said angle member and said clamping ring, and an air pressure supply pipe on said male member connected to the space between said bag and said male member.

2. A mold for forming a plastic burial vault or the like, comprising, a female member having an opening at the top, a base, sides fixed to said base, reinforcing bars fixed to said sides, a lining surrounding said reinforcing bars conforming to the outside configuration of the work piece to be molded, an angle member secured around the top edge of said sides having a sealing surface, a male member adapted to be presented into said female member, an expansible bag covering the outside surface of the male member, a clamping ring fixed to said male member and engaging the outer edge of said bag to form an air tight space between the inside of said bag and the outside surface of said male member, said clamping ring having a mating sealing surface adapted to engage said sealing surface on said angle member so as to form an air tight chamber between the outside of said bag and said lining, a vacuum suction line in said clamping ring connected into said space adjacent the upper inner edge of said lining, releasable clamping means between said angle member and said clamping ring to secure their respective mating sealing surfaces together, and an air pressure supply pipe on the inside of said male member having a discharge opening in the bottom of the crown of said male member in communication with the space between said bag and the outside surface of said male member.

References Cited in the file of this patent

UNITED STATES PATENTS

| | | |
|---|---|---|
| 2,281,133 | Abercrombie | Apr. 28, 1942 |
| 2,363,107 | Young | Nov. 21, 1944 |
| 2,441,097 | Hicks | May 4, 1948 |
| 2,495,640 | Muskat | Jan. 24, 1950 |
| 2,613,397 | Borkland | Oct. 14, 1952 |

FOREIGN PATENTS

| | | |
|---|---|---|
| 392,952 | Great Britain | May 22, 1932 |